United States Patent
Tamoney

(10) Patent No.: US 9,882,653 B2
(45) Date of Patent: Jan. 30, 2018

(54) SYSTEM AND METHOD OF DE-SKEWING ELECTRICAL SIGNALS

(71) Applicant: Arista Networks, Inc., Santa Clara, CA (US)

(72) Inventor: Andrew Ahern Tamoney, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 22 days.

(21) Appl. No.: 14/683,745

(22) Filed: Apr. 10, 2015

(65) Prior Publication Data

US 2016/0301520 A1 Oct. 13, 2016

(51) Int. Cl.
 H04B 10/61 (2013.01)
 H04B 10/079 (2013.01)
 H04J 14/02 (2006.01)
 H04L 25/14 (2006.01)

(52) U.S. Cl.
 CPC ..... H04B 10/6162 (2013.01); H04B 10/0799 (2013.01); H04B 10/616 (2013.01); H04J 14/02 (2013.01); H04L 25/14 (2013.01)

(58) Field of Classification Search
 CPC .............. H04B 10/0799; H04B 10/616; H04B 10/6162; H04J 14/02; H04L 7/00; H04L 7/0008; H04L 7/0012; H04L 7/0079; H04L 7/0091; H04L 25/14; G06F 1/10; G06F 1/105; G06F 1/12; G06F 1/14; G06F 1/16
 USPC ....... 375/226, 354, 356, 358, 368, 371, 373; 713/400, 503, 66
 See application file for complete search history.

(56) References Cited

U.S. PATENT DOCUMENTS

| | | | |
|---|---|---|---|
| 2003/0043926 A1* | 3/2003 | Terashima | H04L 7/0012 375/257 |
| 2004/0165888 A1 | 8/2004 | Gerstel et al. | |
| 2007/0083786 A1 | 4/2007 | Chiang | |
| 2010/0284486 A1 | 11/2010 | Kuwata | |
| 2011/0229127 A1 | 9/2011 | Sakamoto et al. | |
| 2013/0322872 A1 | 12/2013 | Jobert et al. | |
| 2014/0270751 A1 | 9/2014 | Figueria | |

(Continued)

OTHER PUBLICATIONS

PCT International Search Report and Written Opinion for PCT International Appln No. PCT/US2016/026225 dated Aug. 24, 2016. (13 pages).

*Primary Examiner* — Young T Tse
(74) *Attorney, Agent, or Firm* — Blakely Sokoloff Taylor & Zafman LLP

(57) ABSTRACT

A method and apparatus of a device that determines transmit and receive skew times between pairs of lanes of an electrical interface of a network element is described. In an exemplary embodiment, the device receive a plurality of configurations corresponding to a plurality of electrical loopbacks that can each couple transmit and receive interfaces of the electrical interface via the plurality of lanes in different patterns. In addition, for each of the plurality of electrical loopbacks, the device couples this electrical loopback to the transmit and receive interfaces of the electrical interface and measures overall skew times for pairs of the plurality of lanes of the electrical interface. Furthermore, the device computes the transmit and receive skew times for the transmit and receive interfaces from the overall skew times.

20 Claims, 13 Drawing Sheets

(56) References Cited

U.S. PATENT DOCUMENTS

2015/0381340 A1* 12/2015 Pandey .................... H04B 3/00
375/226

* cited by examiner

SYSTEM AND METHOD OF DE-SKEWING ELECTRICAL SIGNALS

FIELD OF INVENTION

This invention relates generally to data networking, and more particularly, to de-skewing electrical signals in preparation to be modulated into a WDM optical signal.

BACKGROUND OF THE INVENTION

A network element with an optical link can transmit multiple wavelengths on a single optical link in order to transmit more data on that optical link. In order to further increase capacity and extend reach of an optical link, multiple electrical signals are modulated into a single optical wavelength. For example, the optical signal can be a coherent optical signal where the multiple electrical signals are modulated into the optical wavelength. In this example, the electrical signals are modulated using polarization and quadrature to create a coherent optical signal on one wavelength from the electrical signals. In order to successfully demodulate the signals on the other end of the link, these signals need to arrive at the optical modulator at the same time. There also must be similar alignment on the receive physical interface (PHY). For example, if a pulse is transmitted on the four wires simultaneously, each of these pulses need to arrive within fractions of picoseconds in order for the pulses to be recovered on the receive PHY optimally. The amount of time difference in the pulse arrival between signals is known as skewing.

A pulse is delayed for a signal based on manufacturing variabilities that are inherent in the PHY, circuit board, connector interfaces and optical modules. A process known as de-skewing is performed to determine the amount of skew in the optical link and to configure the transmit and receive interfaces to remove this skew. The de-skewing process needs to be performed for each electrical interface that is manufactured for each network element. For example, the skew can be determined using a digital communications analyzer (DCA). The DCA measures the skew of the transmit PHYs and adjusts the skew to compensate for any difference between electrical signals. Properly de-skewed transmit signals then allows the receive PHY skews to be properly measured. This measurement can be performed by the PHY itself and requires no external hardware. With a de-skewed optical link, data transported in a coherent manner, arrive at the receive PHY within the allowed tolerances.

A problem with using the DCA to determine the transmit and receive PHYs skews is that this is an expensive process because the DCA itself is a very expensive and precise instrument. Introducing the DCA into the manufacture and calibration process of a network element with an optical interface increases the cost of manufacturing process for this device. Furthermore, the DCA is a precise instrument that is better suited in a lab environment rather than a manufacturing environment. This can mean that the DCA is not robust enough to be used long-term in a manufacturing environment leading to further cost due to DCA maintenance. Thus, using a DCA in such an environment increases the cost to produce and manufacturer network element with an optical interface.

SUMMARY OF THE DESCRIPTION

A method and apparatus of a device that determines transmit and receive skew times between pairs of lanes of an electrical interface of a network element is described. In an exemplary embodiment, the device receives a plurality of configurations corresponding to a plurality of electrical loopbacks that can each couple transmit and receive interfaces of the electrical interface via the plurality of lanes in different patterns. In addition, for each of the plurality of electrical loopbacks, the device couples this electrical loopback to the transmit and receive interfaces of the electrical interface and measures overall skew times for pairs of the plurality of lanes of the electrical interface. Furthermore, the device computes the transmit and receive skew times for the transmit and receive interfaces from the overall skew times.

In another embodiment, the device couples an optical loopback to transmit and receive interfaces of an optical interface, the optical loopback capable of transporting a first optical signal with a plurality of polarization and quadrature combinations. In addition, the device determines the receive skew time by transmitting a second optical signal on the optical loopback with one of the plurality of polarization and quadrature combinations. Furthermore, the device determines the transmit skew time by tuning transmission delays on the transmit interface for a third optical signal with components corresponding to a pair of the plurality of polarization and quadrature combinations such that the third optical signal is recoverable on the receive interface.

Other methods and apparatuses are also described.

BRIEF DESCRIPTION OF THE DRAWINGS

The present invention is illustrated by way of example and not limitation in the figures of the accompanying drawings in which like references indicate similar elements.

FIGS. 4A-D are block diagrams of embodiments of using an electrical loopback to determine signal skew times.

DETAILED DESCRIPTION

Figure 1A:
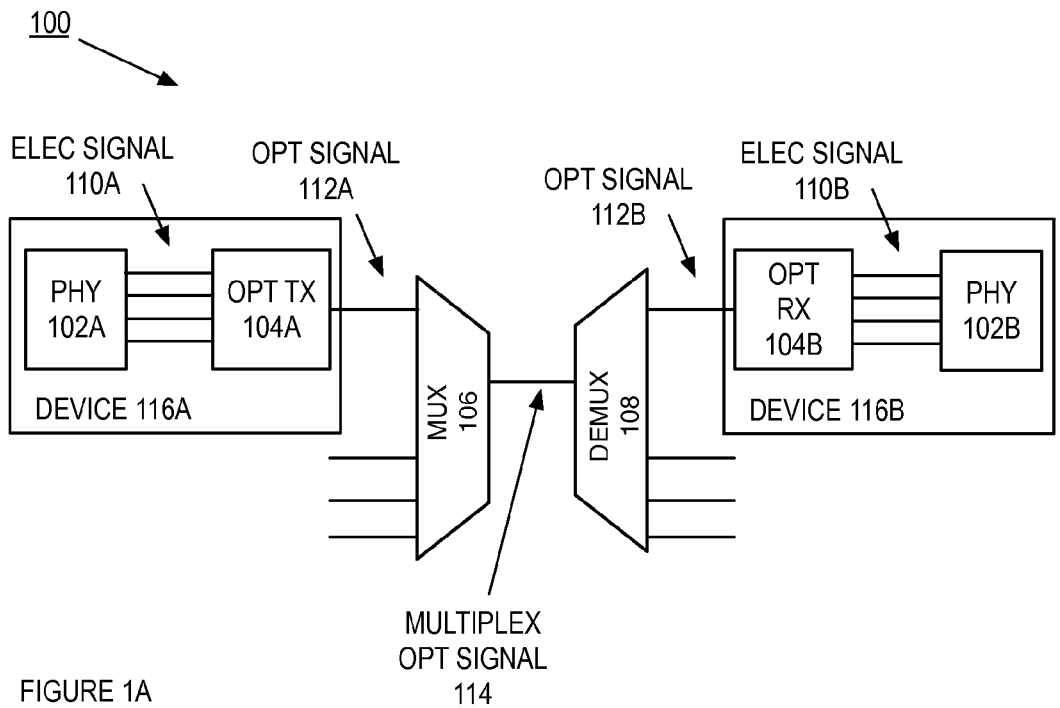
FIG. 1A is a block diagram of one embodiment of two devices coupled by an optical link.

A method and apparatus of a device that determines transmit and receive skew times between pairs of lanes of an electrical interface of a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines transmit and receive skew times between pairs of lanes of an electrical interface of a network element is described. In one embodiment, the device determines the transmit and receive skew times for a transmit and receive PHY using either an electrical loopback or an optical loopback. These transmit and receive skew times can be used to compensate the transmit and receive PHY such that a coherent optical signal can be transmitted and/or received using the PHYs. In one embodiment, the device measures multiple overall skew times between different lanes of the transmit and receives PHYs using different electrical loopbacks so as to determine individual transmit and receive skew times. For example and in one embodiment, the device measures an overall skew times for lanes 1 and 2 and lanes 3 and 4 for a transmit and receive PHY using three or four different electrical loopbacks. In this example, the different electrical loopbacks represent different patterns of coupling the transmit PHY lanes to the receive PHY lanes. The electrical loopbacks can be a straight line connection or a twisted connection that couples one of the transmit lanes with a different numbered receive PHY lane. Each of the electrical loopback configurations has an associated set of equations that relates the overall skew times to the individual transmit and receive skew times. In one embodiment, by using three of the different electrical loopbacks, the individual transmit and receive skew times can be determined for a PHY with four lanes.

In another embodiment, the device determines the transmit and receive skew times using an optical loopback that couples a transmit and receive PHY by selectively transmitting electrical pulses on one, some, and/or all of the transmit electrical lanes of the transmit PHY. In this embodiment, by transmitting an electrical pulse on different ones of the transmit PHY lanes, the device can determine the individual receive skew times. With the known receive skew times, the device can determine the individual transmit skew times by transmitting electrical pulses on pairs or all of the electrical lanes and varying the pulse transmission times, such that a recoverable signal is found on the receive PHY.

FIG. 1A is a block diagram of one embodiment of two devices 116A-B coupled by an optical link 114 via the PHYs 102A-B of the devices 116A-B. In FIG. 1A, the device 116A includes a PHY 102A and an optical transmitter 104A, where the PHY 102A is coupled to optical transmitter 104A by electrical wires that carry electrical signals 110A. In one embodiment, the optical transmitter 104A is part of an optical module (not illustrated) of an optical interface of the device 116A and the PHY 102A is on a board (e.g., a line card, motherboard, or other type of board). In this embodiment, the optical module may also include other optical transmitters and receivers. For example and in one embodiment, the optical transmitter 104A is a compact form pluggable-2 (CFP2) module. The optical transmitter 104A is coupled to a multiplexer 106 via an optical link that carries an optical signal 112A transmitted by the optical transmitter 104A. The multiplexer 106 multiplexes this optical signal with other optical signals and transmits the multiplexed optical signal to the de-multiplexer 108. In one embodiment, the optical link 114 is a fiber-optic link that is capable of transmitting multiple wavelengths concurrently. For example and in one embodiment, the optical link 114 is a wavelength division multiplexing (WDM) optical link that multiplexes a number of different wavelengths in a single optical fiber by using different wavelengths of laser light. The optical link can be a coarse DM, dense DM, or another type of optical link 114 that multiplexes difference wavelengths in an optical signal. In this example, a multiplexer 106 at the transmitter joins the different wavelengths together and a de-multiplexer at the receiver splits these wavelengths apart. The de-multiplexer 108 de-multiplexes the received optical signal 114 into separate single wavelength optical signals 112B. One of the single wavelength optical signals 112B is received by the device 116B. The device 116B includes a PHY 102B and an optical receiver 104B, where the PHY 102A is coupled to optical receiver 104B by electrical wires that carry electrical signals 110B. In one embodiment, the optical receiver 104B is part of an optical module (not illustrated) of an optical interface of the device 116B. In this embodiment, the optical module may also include other optical transmitters and receivers. In addition, each optical transmitter 104A and receiver 104B is associated with a corresponding transmit 102A and receive PHY 102B, respectively.

In one embodiment, the electrical signals 110A-B carried between the PHY 102A and optical transmitter 104A and between the optical receiver 104B and PHY 102B are a set of electrical pulses. In this embodiment, the PHY 102A generates a set of electrical signals 110A that are converted into a coherent optical signal by modulating the electrical signals using the polarization and quadrature into an optical signal. Each of the electrical signals 110A is transported in a separate lane. The coherent signal is multiplexed with other optical signals, carried as part of the multiplexed optical signal (e.g., WDM), de-multiplexed by a de-multiplexer 108, and received by the optical receiver 104B of device 116B. The optical receiver 104B converts the received coherent optical into a set of electrical signals 110B. Each of the electrical signal 110B carries an electrical pulse in a different lane. In one embodiment, a lane is a wire that carries an electrical signal. In order for the device 116B to recover the data transported on these electrical signals, the different pulses of the electrical signals need to be off by a skew of less than fractions of picoseconds. If the electrical pulses are skewed by more than this amount, the resulting coherent optical signal will be degraded or unable to transport the data.

As described above, the pulses that are transmitted along these lanes need to be aligned within a tight tolerance so as to successfully transport data along the optical link. In one embodiment, the skews for the different lanes can originate in the physical layer (PHY) of the transmitting and receiving interfaces, which are in the electrical domain and before the signal gets transformed into an optical signal. In one embodiment, when a network element with these optical interfaces gets manufactured, each of the transmit and receive interfaces of these electrical interfaces is measured for an inherent skew. Each of these interfaces is then adjusted based upon the measurements so that the pulses transmitted and received by the interfaces of the receive PHY have zero skew or a skew tighter than the acceptable tolerance, such that data can be transmitted across the optical link 114 one coherent wavelength. In one embodiment, an optical interface includes electrical transmit and receive PHYs, as well as optical transmitter and receivers. In this embodiment, the optical transceivers are removable.

Figure 1B:
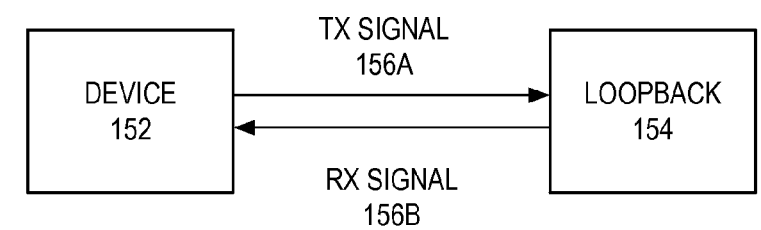
FIG. 1B is a block diagram of one embodiment of devices coupled to a loopback.

In one embodiment, a loopback is used to determine the skews of pulses transmitted across these electrical lanes. FIG. 1B is a block diagram of one embodiment of a device 152 coupled by a loopback. In FIG. 1B, a device 152 is coupled to a loopback 154, where the loopback 154 receives the transmitted signal 156A from the device 152 and forwards this signal 156B to the receive interface of the device 152. In one embodiment, the transmitted and received signals 156A-B are signals that support multiple electrical signals. In one embodiment, the loopback 154 is used to measure the difference in transmission time of pulses sent across the different lanes to determine a skew time for each of the lane. With the skew times measured, the transmit and receive interfaces can be calibrated so that the skew times are within the acceptable tolerances.

Figure 2:
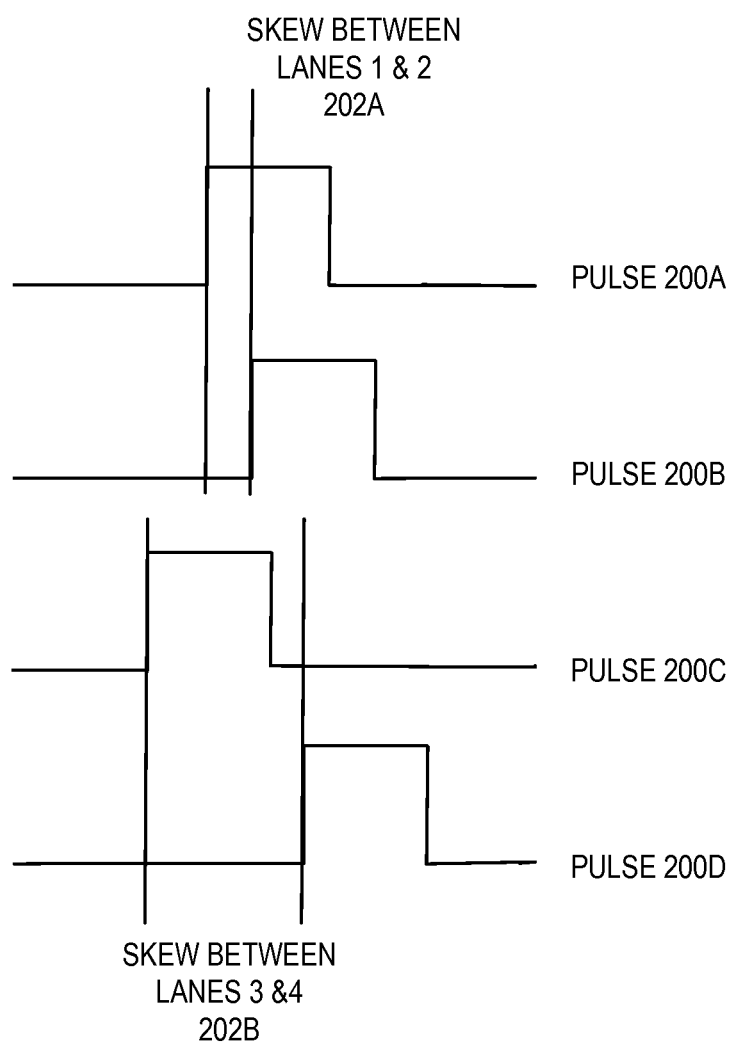
FIG. 2 is an illustration of one embodiment of signal skewing for multiple pulses in a multiple lane signal.

FIG. 2 is an illustration of one embodiment of signal skewing for multiple pulses 200A-D in a multiple lane electrical signal. In FIG. 2, four different pulses 200A-D are illustrated, where the rises of the pulses are not aligned in time. Each of the pulse rises is slightly skewed from the other pulse rises. For example and in one embodiment, there is a skew 202A between pulse 200A and pulse 200B. This skew 202A is the time difference between the rise in the pulses of lanes 1 and 2. As described above, this skew 202A can occur in the electrical domain, which means the skew 202A originates in the PHY of the transmit and receive interfaces when the signal is an electrical signal, and not while the signal is an optical signal. Thus, in this embodiment, each of the pulses 202A-D is an electrical pulse. Pulses 202A-D correspond to lane 1-4, respectively. There is a skew 202A, S12, between lanes 1 and 2 that is the difference in time between the beginning of the pulse rise for pulsed 202A and pulse 202B. Similarly, there is a skew 202B, S34 for lanes 3 and 4 that is the difference in time between the beginning of the rise in pulse 202C and pulse 202D, respectively. In another embodiment, there can be skews between other lane pairs (not illustrated), such as S13 (skew between lanes 1 and 3), S14 (skew between lanes 1 and 4), S23 (skew between lanes 2 and 3), and S24 (skew between lanes 2 and 4).

Figure 3:
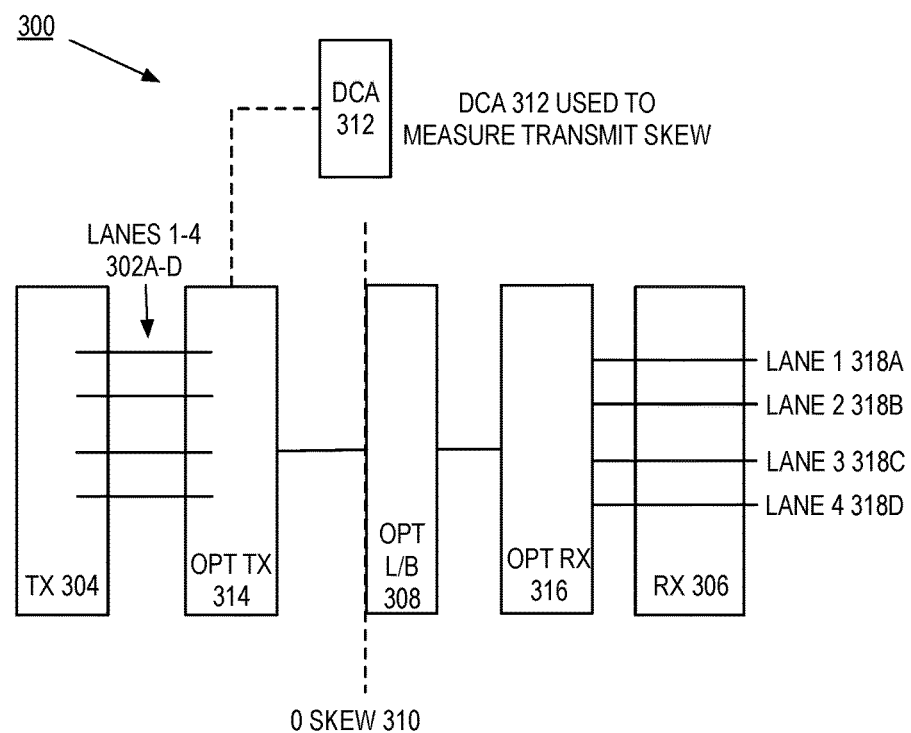
FIG. 3 is a block diagram of one embodiment of an electrical loopback using a DCA to determine transmit and receive PHY skew times.

FIG. 3 (prior art) is a block diagram of one embodiment of using an optical loopback 308 and a DCA 312 to determine signal skew times. In FIG. 3, the transmit PHY 304 is coupled to an optical TX 314 with a set of lanes 302A-D. Each of these lanes carries an electrical signal. In one embodiment, the electrical signals are labeled HI, HQ, VI, and VQ, which reference a different set of polarization and quadrature combinations. In one embodiment, each lane is a set of two wires (1 positive, 1 negative). A voltage difference is applied across the wires to indicate a 1 or 0 (or some analog value in between). The optical TX 314 modulates these electrical signals into a coherent optical signal that is transmitted to a digital communications analyzer (DCA) 312 that is used to determine the transmit skew used to times for each lane, lanes 1-4 (302A-D). In one embodiment, the optical drivers can be turned on, one at a time, to measure and adjust the skew times of lanes 1-4 (302A-D), such that there is zero skew between these lanes 302A-D (310). In one embodiment, the DCA 312 terminates the coherent optical signal. After the transmit skew has been measured and compensated for, the DCA 312 can be removed. An optical loopback 308 is inserted in place of the DCA 312 to allow the coherent optical signal to be transported to the optical receive 316. The optical loopback 308 forwards the optical signal to the optical receiver 316 which forwards the electrical signal to the receive PHY 306. Since there is zero skew before the optical loopback 308, the skew that is measured in the receive PHY 306 is due to skew introduced in the optical receive 316 and receive PHY 306. While this scheme can be used to determine the skew for both the transmit PHY 304 and the receive PHY 306, using a DCA 312 to determine these skew times is expensive because the DCA 312 itself is a very expensive and precise instrument. Introducing the DCA 312 into the manufacture and calibration process of a network element with an optical interface increases the cost of manufacturing this device. Furthermore, the DCA 312 is a precise instrument that is better suited in a lab environment rather than a manufacturing environment. This can mean that the DCA 312 is not robust enough to be used long-term in a manufacturing environment. Thus, using a DCA 312 in such an environment increases the cost to produce and manufacture a network element with an optical interface.

Figure 4B:
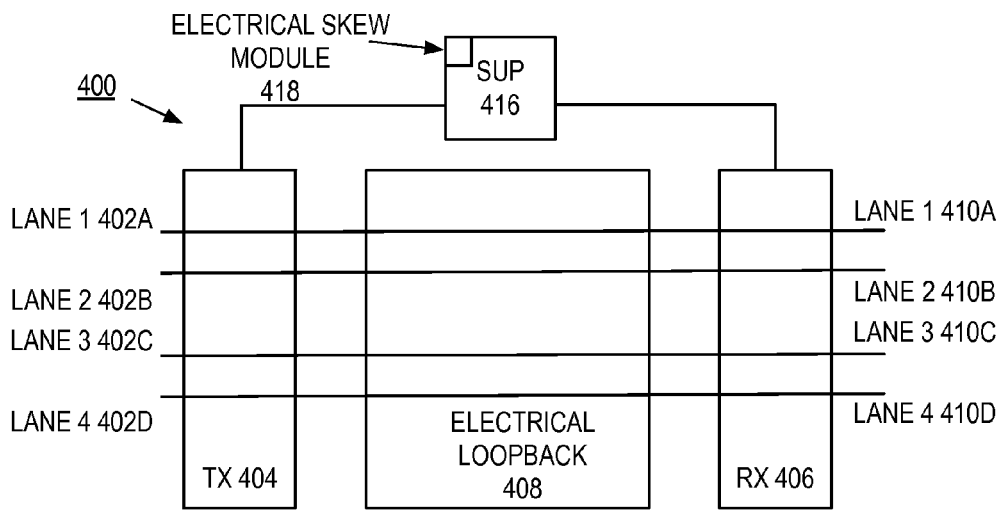
Figure 4B:
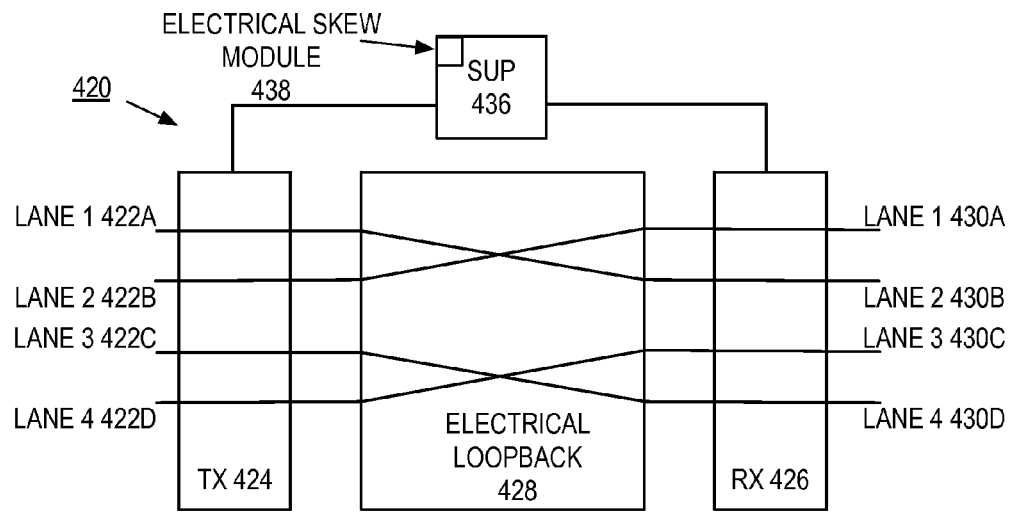

As per above, manufacturing and calibrating a network element with multiple electrical lanes which are highly sensitive to skew using the DCA increases the cost of manufacturing calibrate such a network element. FIGS. 4A-D are block diagrams of embodiments of using an electrical loopback or loopbacks to determine signal skew times. In FIGS. 4A-D, electrical loopbacks with different electrical connectivity are used to determine the transmit PHY and receive PHY skew times. In FIG. 4A, a straight line electrical loopback 408 is used to couple the lanes 402A-D of the transmit PHY 404 to the lanes 410A-D of the receive PHY 406, respectively. In one embodiment, the transmit PHY 404 and the receive PHY 406 are part of the same PHY module. In one embodiment, overall skew times can be measured for different line pairs using this electrical loopback 408. In this embodiment, the overall skew times for lanes 1 and 2, S12, is equal to the skew due to the transmit PHY 404, the skew due to the receive PHY 406, and the skew due to the electrical loopback 408. Mathematically, this can be represented (412) as $$S_{12}=T_{12}+R_{12}+C_{A12} \quad (1)$$

where $T_{12}$ is the skew due to the transmit PHY 404 for lanes 1 and 2 (402A-B), $R_{12}$ is the skew due to the receive PHY 406 for lanes 1 and 2 (410A-B), and $C_{A12}$ is the skew due to the electrical loopback 408 for lanes 1 and 2. In one embodiment, the electrical loopback 408, $C_{A12}$, skew is a known quantity that is determined before the skew is measured for the transmit and receive PHYs. Similarly, the overall skew times for lanes 3 and 4, $S_{34}$, is equal to the skew due to the transmit PHY 404, the skew due to the receive PHY 406, and the skew due to the electrical loopback 408. Mathematically, this can be represented (414) as $$S34=T34+R34+CA34 \quad (2)$$

where $T_{34}$ is the skew due to the transmit PHY 404 for lanes 3 and 4 (402C-D), $R_{34}$ is the skew due to the receive PHY 406 for lanes 3 and 4 (410C-D), and $C_{A34}$ is the skew due to the electrical loopback 408 for lanes 3 and 4. In one embodiment, the electrical loopback 408 constant, $C_{A34}$, skew is a known quantity that is determined before the skew is measured for the transmit and receive PHYs. In one embodiment, the system 400 includes a supervisor 416 that records the overall skew times and which type of electrical loopback is used. In one embodiment, the supervisor 416 is a separate computer that includes an electrical skew module 418 that controls the skew time measurement and records the skew times. In another embodiment, the supervisor 416 is part of the network element that is testing and recording the skew times.

In one embodiment, the equations (1) and (2) have several unknowns ($T_{12}$, $R_{12}$, $T_{34}$, and $R_{34}$) that can be found by using additional loopbacks with different electrical connections between the transmit and receive lanes. In FIG. 4B, a twisted electrical loopback 428 is used to couple the lanes 1 and 2 (422A-B) of the transmit PHY 424 to the lanes 2 and 1 (430B and 430A) of the receive PHY 426, respectively. In addition, the twisted electrical loopback 428 is used to couple the lanes 3 and 4 (422C-D) of the transmit PHY 424 to the lanes 4 and 3 (430D and 430C) of the receive PHY 426, respectively. In one embodiment, the transmit PHY 424 and the receive PHY 426 are part of the same PHY module. In one embodiment, by swapping the lanes as illustrated, different equations are used to determine the overall skew times. In this embodiment, the overall skew times using this electrical loopback can be measured for different lane pairs using this electrical loopback 428. In this embodiment, the overall skew times for lanes 1 and 2, $S_{12}$, is equal to the skew due to the transmit PHY 424, the skew due to the receive PHY 426, and the skew due to the electrical loopback 428. Mathematically, this can be represented (432) as $$S12=-T12+R12+CB12 \quad (3)$$

where $T_{12}$ is the skew due to the transmit PHY 424 for lanes 1 and 2 (422A-B), $R_{12}$ is the skew due to the receive PHY 426 for lanes 1 and 2 (430A-B), and $C_{B12}$ is the skew due to the electrical loopback 428 for lanes 1 and 2. In one embodiment, the electrical loopback 428, $C_{B12}$, skew is a known quantity that is determined before the skew is measured for the transmit and receive PHYs. Similarly, the overall skew times for lanes 3 and 4, $S_{34}$, is equal to the skew due to the transmit PHY 424, the skew due to the receive PHY 426, and the skew due to the electrical loopback 428. Mathematically, this can be represented (434) as $$S34=-T34+R34+CB34 \quad (4)$$

where $T_{34}$ is the skew due to the transmit PHY 424 for lanes 3 and 4 (422C-D), $R_{34}$ is the skew due to the receive PHY 426 for lanes 3 and 4 (430C-D), and $C_{B34}$ is the skew due to the electrical loopback 428 for lanes 3 and 4. In one embodiment, the electrical loopback 428 constant, $C_{B34}$, skew is a known quantity that is determined before the skew is measured for the transmit and receive PHYs. In one embodiment, the system 420 includes a supervisor 436 that records the overall skew times and which type of electrical loopback is used. In one embodiment, the supervisor 436 is a separate computer that includes an electrical skew module 438 that controls the skew time measurement and records the skew times. In another embodiment, the supervisor 436 is part of the network element that is testing and recording the skew times.

Figure 4C:
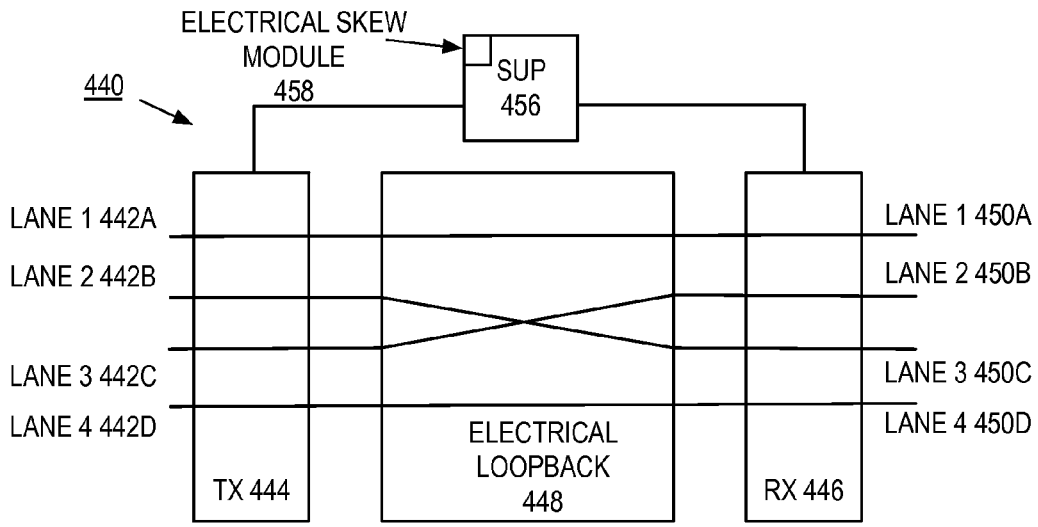

With loopbacks 408 and 428, the skew between lanes 1 and 2 and lanes 3 and 4 can be determined, but the skew between, for example, lanes 2 and 3 (or 1 and 4, etc.) is still unknown. In FIG. 4C, another type of twisted electrical loopback 448 is used to couple the lanes 2 and 3 (442B-C) of the transmit PHY 444 to the lanes 3 and 2 (450C and 450B) of the receive PHY 446, respectively. In one embodiment, the transmit PHY 444 and the receive PHY 446 are part of the same PHY module. In addition, this electrical loopback 448 couples the lanes 1 and 4 (442A and 442D) of the transmit PHY 444 to the lanes 1 and 4 (450A and 450D) of the receive PHY 446, respectively. In one embodiment, by swapping the middle lanes as illustrated, different equations are used to determine the overall skew times. In this embodiment, the overall skew times using this electrical loopback can be measured for different line pairs using this electrical loopback 448. In this embodiment, the overall skew times for lanes 1 and 2, $S_{12}$, is equal to the skew due to the transmit PHY 444, the skew due to the receive PHY 446, and the skew due to the electrical loopback 448. Mathematically, this can be represented (452) as $$S12=T13+R12+CC13 \quad (5)$$

where $T_{13}$ is the skew due to the transmit PHY 444 for lanes 1 and 3 (442A and 442C), $R_{12}$ is the skew due to the receive PHY 446 for lanes 1 and 2 450A-B), and $C_{C13}$ is the skew due to the electrical loopback 428 for lanes 1 and 3. In one embodiment, the electrical loopback 448, $C_{C13}$, skew is a known quantity that is determined before the skew is measured for the transmit and receive PHYs. Similarly, the overall skew times for lanes 3 and 4, $S_{34}$, is equal to the skew due to the transmit PHY 444, the skew due to the receive PHY 446, and the skew due to the electrical loopback 448. Mathematically, this can be represented (454) as $$S34=T24+R34+CC24 \quad (4)$$

where $T_{24}$ is the skew due to the transmit PHY 444 for lanes 4 and 2 (442C and 422B), $R_{34}$ is the skew due to the receive PHY 446 for lanes 3 and 4 (450C-D), and $C_{C24}$ is the skew due to the electrical loopback 448 for lanes 2 and 4. In one embodiment, the electrical loopback 448 constant, $C_{C24}$, skew is a known quantity that is determined before the skew is measured for the transmit and receive PHYs. In one embodiment, by using these three different electrical loopback gives equations (1)-(6) with six unknowns ($T_{12}$, $T_{34}$, $T_{13}$, $T_{24}$, $R_{12}$, and $R_{34}$) that can be solved. In one embodiment, the skew time $T_{24}$ is a linear combination of the other three transmit skews, which reduces the number of unknowns to five. Solving these equations gives the transmit and receive skew times that can be used to de-skew the transmit and receive PHYs. While in one embodiment, specific electrical loopback configurations are illustrated, in alternate embodiments, different electrical loopback configurations can be used to determine transmit and receive PHY skew times. In a further embodiment, different electrical loopback configurations can be used for electrical lane de-skewing for more or less than four lanes. In a further embodiment, different skews can be measured to meet different requirements for optical modules and DSPs. In one embodiment, the system 440 includes a supervisor 456 that records the overall skew times, which type of electrical loopback is used, and solves for the transmit and receive PHY skew times. In one embodiment, the supervisor 456 is a separate computer that includes an electrical skew module 458 that controls the skew time measurement and records the skew times. In another embodiment, the supervisor 456 is part of the network element that is testing and recording the skew times.

Figure 4D:
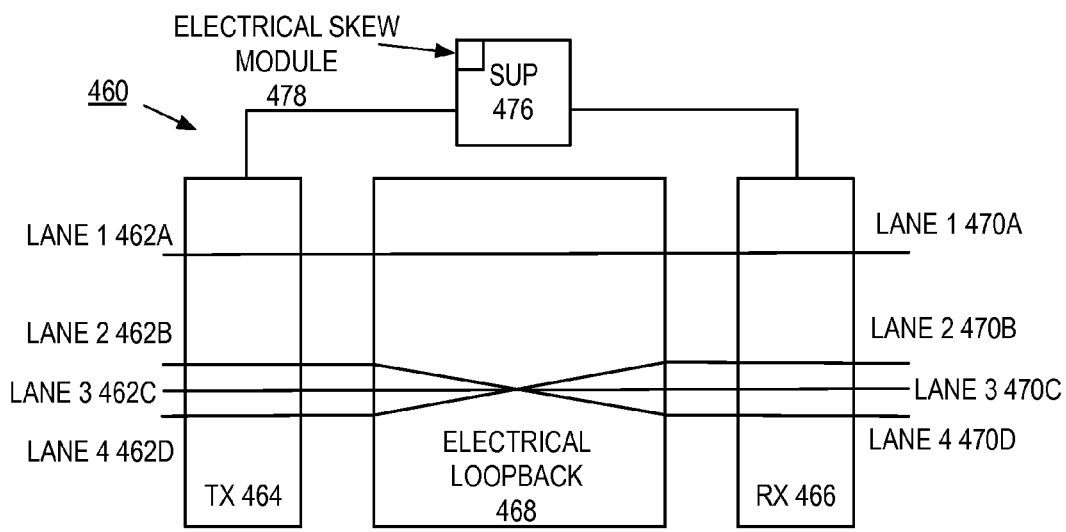

In one embodiment, an additional electrical loopback configuration can be used to check the results of the electrical loopbacks used above in FIGS. 4A-C. In FIG. 4D, a further type of twisted electrical loopback 468 is used to couple the lanes 2 and 4 (462B and 462C) of the transmit PHY 464 to the lanes 4 and 2 (470D and 470B) of the receive PHY 466, respectively. In one embodiment, the transmit PHY 464 and the receive PHY 466 are part of the same PHY module. In addition, this electrical loopback 468 couple the lanes 1 and 3 (462A and 462C) of the transmit PHY 464 to the lanes 1 and 3 (470A and 470C) of the receive PHY 466, respectively. In one embodiment, by swapping lanes 2 and 4 as illustrated, different equations are used to determine the overall skew times. In this embodiment, the overall skew times using this electrical loopback can be measured for different line pairs using this electrical loopback 468. In this embodiment, the overall skew times for lanes 1 and 2, $S_{12}$, is equal to the skew due to the transmit PHY 464, the skew due to the receive PHY 466, and the skew due to the electrical loopback 468. Mathematically, this can be represented (472) as $$S12 = T14 + R12 + CD14 \quad (7)$$

where $T_{14}$ is the skew due to the transmit PHY 464 for lanes 1 and 4 (462A and 462D), $R_{12}$ is the skew due to the receive PHY 466 for lanes 1 and 2 (462A-B), and $C_{D14}$ is the skew due to the electrical loopback 428 for lanes 1 and 4 (462A and 462D). In one embodiment, the electrical loopback 468 skew $C_{D14}$ is a known quantity that is determined before the skew is measured for the transmit and receive PHYs. Similarly, the overall skew times for lanes 3 and 4, $S_{34}$, is equal to the skew due to the transmit PHY 464, the skew due to the receive PHY 466, and the skew due to the electrical loopback 468. Mathematically, this can be represented (474) as $$S34 = T32 + R34 + CD32 \quad (8)$$

where $T_{32}$ is the skew due to the transmit PHY 464 for lanes 3 and 2 (462C and 462B), $R_{34}$ is the skew due to the receive PHY 466 for lanes 3 and 4 (462C-D), and $C_{D32}$ is the skew due to the electrical loopback 468 for lanes 3 and 2 (462C-D). In one embodiment, the electrical loopback 468 constant, $C_{C32}$, skew is a known quantity that is determined before the skew is measured for the transmit and receive PHYs. In one embodiment, with the additional electrical loopback, the skew times $T_{14}$ and $T_{32}$ can be determined. The skew times $T_{14}$ and $T_{32}$ can be compared to $T_{14}$ and $T_{32}$ that are derived from the $T_{12}$, $T_{24}$, $T_{13}$, $T_{24}$ determined using the electrical loopbacks in FIGS. 4A-C. In one embodiment, using the additional electrical loopback provides additional precision but is optional. In one embodiment, the system 460 includes a supervisor 476 that records the overall skew times, which type of electrical loopback is used, and solves for the transmit and receive PHY skew times. In one embodiment, the supervisor 476 is a separate computer that includes an electrical skew module 478 that controls the skew time measurement and records the skew times. In another embodiment, the supervisor 476 is part of the network element that is testing and recording the skew times.

Figure 5:
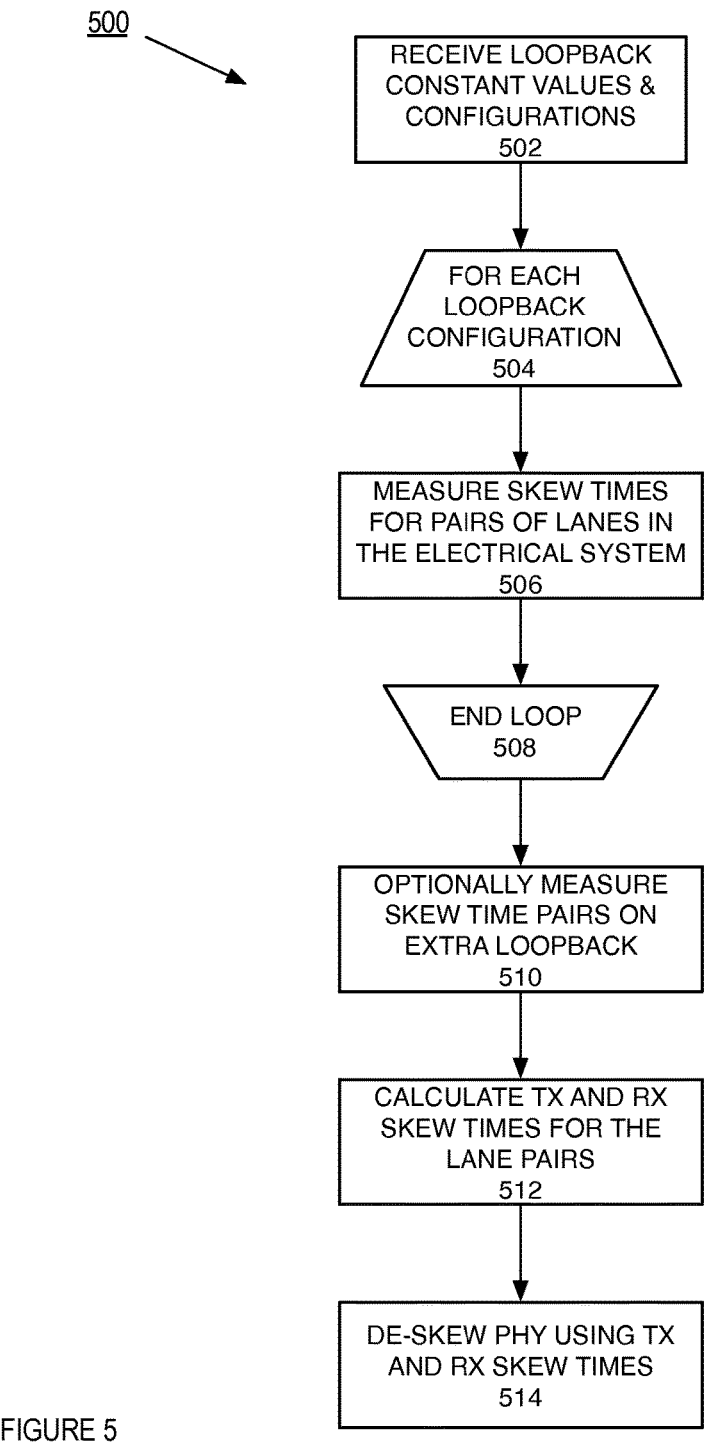
FIG. 5 is a flow diagram of one embodiment of a process to use different electrical loopbacks to determine skew times of an optical interface with multiple wavelengths.

FIG. 5 is a flow diagram of one embodiment of a process 500 to use different electrical loopbacks to determine skew times of an electrical interface with multiple lanes. In one embodiment, an electrical skew module performs process 500, such as the electrical skew module 900 as described in FIG. 9 below. In FIG. 5, process 500 begins by receiving the loopback constant values and configurations at block 502. In one embodiment, the loopback configuration is the type of electrical loopbacks used and the skew equations associated with each of the electrical loopbacks. For example and in one embodiment, the type of electrical loopbacks can be the loopback as illustrated in FIGS. 4A-D above. In this example, the mathematical equations associated with these electrical loopback are equations (1)-(8) as described above. In addition, process 500 receives the constants for the electrical loopbacks. In one embodiment, the constants represent the skew introduced by each of the electrical loopbacks and are known prior to being used by process 500.

Process 500 performs a processing loop (blocks 504-508) to measure overall skew times for each of the electrical loopbacks used to determine the transmit and receive PHY skew times. In one embodiment, process 500 performs the processing loop using the electrical loopbacks to determine the transmit and receive PHY skew times, such as the electrical loopbacks as illustrated in FIGS. 4A-C above. At block 506, process 500 measures the overall $S_{12}$ and $S_{34}$ skew times for lane pairs (1,2) and (3,4), respectively, using the electrical loopback. In one embodiment, process 500 measures the skew times by using a digital signal processor (DSP) that is part of the receive PHY. Process records these skew times for each electrical loopback used. The processing loop ends at block 508.

At block 510, process 500 optionally measures the $S_{12}$ and $S_{34}$ skew times using an additional electrical loopback. In one embodiment, this additional electrical loopback is used to check and possibly adjust the transmit and receive PHY skew times that are computed using the electrical loopbacks skew times measured in block 506. For example and in one embodiment, process 500 uses the electrical loopback as illustrated in FIG. 4D to generate the extra $S_{12}$ and $S_{34}$ skew times.

At block 512, process 500 computes the transmit and receive PHY skew times using the overall $S_{12}$ and $S_{34}$ skew times measured at block 506 and optionally, block 510. In one embodiment, process 500 uses the measured $S_{12}$ and $S_{34}$ skew times along with the mathematical equations associated with each electrical loopback used to compute the transmit and receive PHY skew times. For example and in one embodiment, process 500 uses the measure $S_{12}$ and $S_{34}$ skew times for the electrical loopbacks as illustrated in FIGS. 4A-C along with Equations (1)-(6) to compute the $T_{12}$, $T_{24}$, $T_{13}$, $T_{24}$, $R_{12}$, and $R_{34}$ as described above. In another embodiment, process 500 uses an optional electrical loopback to check and possibly adjust the computed transmit and receive PHY skew times. For example and in one embodiment, uses the measure $S_{12}$ and $S_{34}$ skew times for the electrical loopbacks as illustrated in FIGS. 4A-D along with Equations (1)-(8) to compute the $T_{12}$, $T_{24}$, $T_{13}$, $T_{24}$, $R_{12}$, and $R_{34}$ as described above. At block 514, process 500 de-skews the transmit and receive PHYs using the computed transmit and receive PHY times. For example and in one embodiment, for an electrical link with four lanes, process 500 de-skews this link using the computed $T_{12}$, $T_{24}$, $T_{13}$, $T_{24}$, $R_{12}$, and $R_{34}$ skew parameters.

Figure 6A:
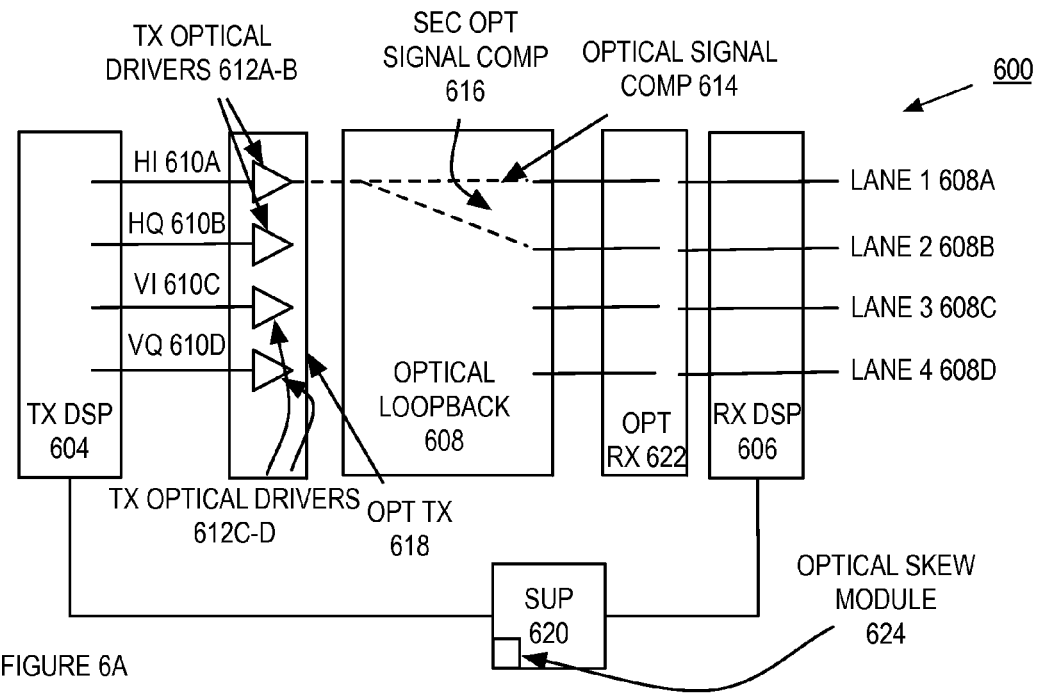
FIGS. 6A-B are block diagrams of embodiments using an optical loopback to determine receive PHY skew times.
Figure 6B:
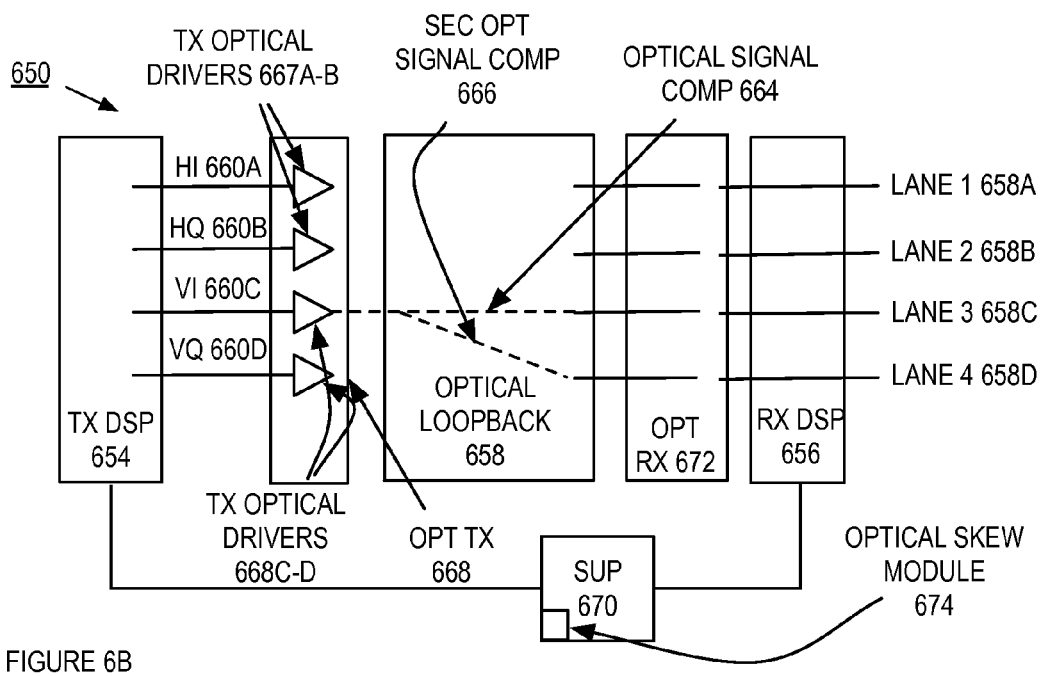

As described above, skew parameters and de-skewing can be accomplished using electrical loopbacks without the need for a DCA. In addition, skew parameters and de-skewing can also be accomplished using an optical loopback without the need for a DCA as well. FIGS. 6A-B are block diagrams of embodiments of using an optical loopback to determine receive PHY skew times. In FIGS. 6A-B, the optical loopback is a loopback the couples the optical transmitter with the optical receiver, respectively, via an optical signal transported across the optical loopback. In FIG. 6A, the transmit PHY 604 is coupled to an optical TX 618 with a set of lanes 610A-D. Each of these lanes 610A-D carries an electrical signal. In one embodiment, the electrical signals are labeled HI, HQ, VI, and VQ, which reference a different set of polarization and quadrature combinations. The optical TX 618 modulates these electrical signals into a coherent optical signal that is transported over an optical loopback 608. In this embodiment, each of the lanes represents a different combination of polarization and quadrature. For example and in one embodiment, lanes 1-4 610A-D of the transmit PHY correspond to HI, HQ, VI, and VQ. For each of these lanes, the optical TX 618 includes transmit optical drivers 612A-D to convert the electrical signals from the electrical transmit PHY 604 to a coherent optical signal that is received by an optical RX 622. The optical RX 622 converts the optical signal into a set of electrical signals that is transmitted to the receive PHY 606. In one embodiment, if a single optical signal component of a coherent optical signal is generated for a lane, a secondary optical signal component can be detected and recovered in an adjacent lane as the optical signal component from one lane can bleed into another lane. For example and in one embodiment, if an optical signal component 614 is generated for lane 1 using transmit optical driver 612A, the optical signal component 614 is recovered for lane 1 (608A) for the receive PHY 606. In addition, a secondary optical signal component 616 is recovered by the receive PHY 606 in lane 2 (608B). In one embodiment, each of these optical signal component (614 and 616) are generated at the same time because the optical signal component are generated from the same source, transmit optical driver 612A. This means there is no transmit skew. For example and in one embodiment, the coherent optical signal in the optical loopback rotates, which can cause the secondary optical signal component to be generated. In this embodiment, the skew detected between lanes 1 and 2 is due to the skew of the receive PHY 606 and the optical receiver, $R_{12}$. In one embodiment, a logic digital signal processor (DSP) that is part of the receive PHY 606 analyzes the signal. In this embodiment, a supervisor computer 620 receives the measurement data and records $R_{12}$. Thus, by transmitting a signal on lanes of the transmit PHY 604 can be used to determine the sum of the optical receiver and receive PHY 606 skew for lanes 1 and 2, $R_{12}$. In one embodiment, the system 600 includes a supervisor 620 that records the overall skew times and solves for the receive PHY skew times. In one embodiment, the supervisor 620 is a separate computer that includes an optical skew module 624 that controls the skew time measurement and records the skew times. In another embodiment, the supervisor 620 is part of the network element that is testing and recording the skew times.

Similarly, $R_{34}$ can be determined using a coherent optical signal generated from a single signal component corresponding to lane 3. In FIG. 6B, the transmit PHY 654 is coupled to an optical TX 668 with a set of lanes 660A-D. Each of these lanes 660A-D carries an electrical signal. In one embodiment, the electrical signals are labeled HI, HQ, VI, and VQ, which reference a different set of polarization and quadrature combinations. The optical TX 668 modulates these electrical signals into a coherent optical signal that is transported over an optical loopback 658. In one embodiment, each of the lanes 660A-D correspond to polarization and quadrature combinations of HI 660A, HQ 660B, VI 660C, and VQ 660D. The optical RX 672 converts the optical signal into a set of electrical signals that is transmitted to the receive PHY 656. In one embodiment, if a single optical signal component for is generated for a lane, a secondary optical signal component can be detected and recovered in an adjacent lane as the optical signal component from one lane can bleed into another lane. For example and in one embodiment, if an optical signal component 664 is generated for lane 3 using transmit optical driver 668C, the optical signal component 664 is recovered for lane 3 (658C) for the receive PHY 656. In addition, a secondary optical signal component 666 is recovered by the receive PHY 656 in lane 4 (658D). In one embodiment, each of these optical signal component (664 and 666) are generated at the same time because the optical signals are generated from the same source, transmit optical driver 662C. In one embodiment, a logic DSP that is part of the receive PHY 656 analyzes the signal. In this embodiment, a supervisor computer 670 receives the measurement data and records $R_{34}$. In this embodiment, the skew detected between lanes 3 and 4 is due to the skew of the receive PHY 656, $R_{34}$. In one embodiment, the system 650 includes a supervisor 670 that records the overall skew times and solves for the receive PHY skew times. In one embodiment, the supervisor 670 is a separate computer that includes an optical skew module 674 that controls the skew time measurement and records the skew times. In another embodiment, the supervisor 670 is part of the network element that is testing and recording the skew times.

Figure 7A:
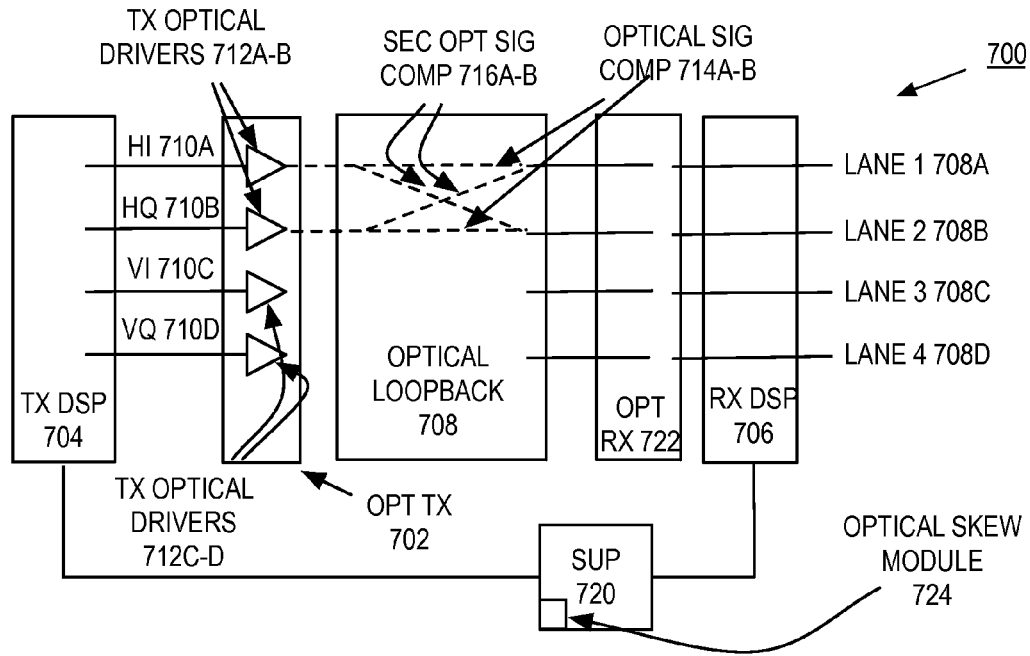
FIG. 7A-C are block diagrams of one embodiment of using an optical loopback to determine transmit PHY skew times.
Figure 7B:
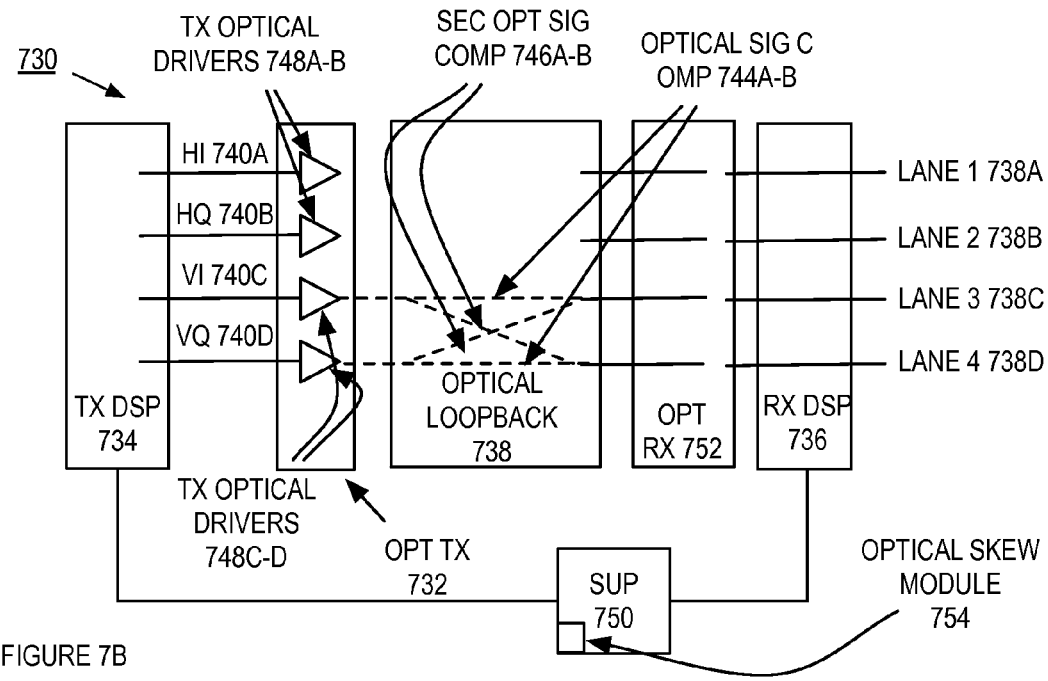
Figure 7C:
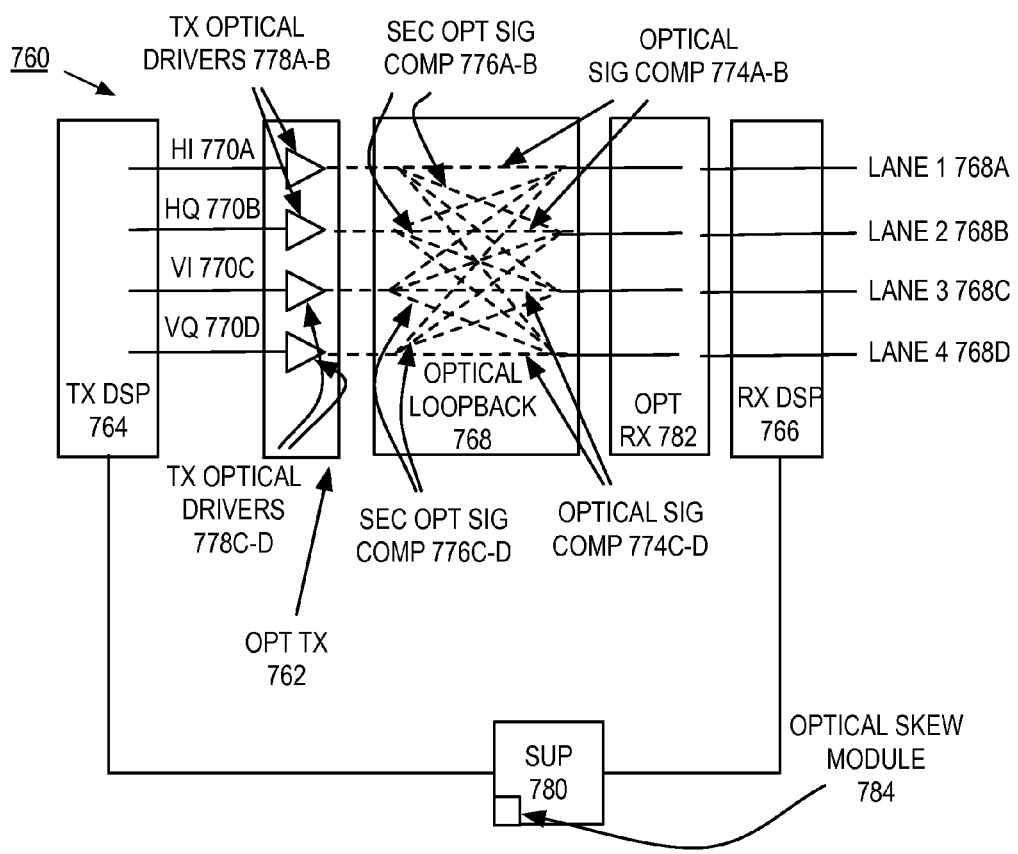

In FIGS. 6A-B, the receive PHY skew times, $R_{12}$ and $R_{34}$ can be determined by sending an electrical signal down one of the lanes using an optical loopback. What is needed is to determine the transmit PHY skew times using the optical loopback. FIG. 7A-C are block diagrams of embodiments of using an optical loopback to determine transmit PHY skew times. In FIG. 7A, the transmit PHY 704 is coupled to an optical TX 702 with a set of lanes 710A-D. Each of these lanes 710A-D carries an electrical signal. In one embodiment, the electrical signals are labeled HI, HQ, VI, and VQ, which reference a different set of polarization and quadrature combinations. The optical TX 702 modulates these electrical signals into a coherent optical signal that is transported over an optical loopback 708. Each of the transmit 704 and receive 706 PHYs are electrical PHYs. The optical loopback 708 transports the optical signal to the optical RX 722. The optical RX 722 converts the optical signal into a set of electrical signals that is transmitted to the receive PHY 706. The $T_{12}$ skew is adjusted by the supervisor 720 until signal is properly recovered by the DSP that is part of the receive PHY 706. The final adjustment is a measure of the $T_{12}$ skew.

In one embodiment, the $T_{12}$ skew time is determined by sending a pulse on lanes 1 and 2 of the transmit PHY 704. In this embodiment, the optical TX 702 generates a coherent optical signal with two optical signal components 714A-B from these pulses. The coherent optical signal is recovered in the receive PHY 706 in lanes 1 and 2 (708A-B). In addition, two secondary optical signal components 716A-B are also generated from the transmit optical drivers 712A-B. Thus, each of the receive PHY lanes 1 and 2 receive two different electrical signals. Because these electrical signals originate from two different transmit PHY lanes, there will be a skew $T_{12}$ between the two different electrical signals received on each lane 1 and 2 (708A-B). With an unknown skew, the received electrical signals may not be recoverable by the RX DSP that is part of the receive PHY 706. This is because the RX DSP cannot interpret the electrical signals that are not within the required skew tolerances. In one embodiment, the supervisor computer 720 adjusts the relative origination times of the electrical signals generated by lanes 1 and 2 of the transmit PHY 704 such that the RX DSP detects a recoverable signal on each of the lanes 1 and 2 (708A-B) of the receive PHY 704. In this embodiment, the difference of the origination times is related to the transmit skew time, $T_{12}$ and the receive skew time, $R_{12}$. Since the receive skew time is known from the determination as illustrated in FIG. 6A, the transmit skew time, $T_{12}$ can be determined. In one embodiment, the system 700 includes a supervisor 720 that records the overall skew times and solves for the receive PHY skew times. In one embodiment, the supervisor 720 is a separate computer that includes an optical skew module 724 that controls the skew time measurement and records the skew times. In another embodiment, the supervisor 720 is part of the network element that is testing and recording the skew times.

Similarly, the transmit skew time, $T_{34}$, can be determined by sending signals originating from lanes 3 and 4 of the transmit PHY. In FIG. 7B, the transmit PHY 734 is coupled to an optical TX 732 with a set of lanes 740A-D. Each of these lanes 740A-D carries an electrical signal. In one embodiment, the electrical signals are labeled HI, HQ, VI, and VQ, which reference a different set of polarization and quadrature combinations. The optical TX 732 modulates these electrical signals into a coherent optical signal that is transported over an optical loopback 738. The optical loopback 738 transports the optical signal to the optical RX 752. The optical RX 752 converts the optical signal into a set of electrical signals that is transmitted to the receive PHY 706. The T34 skew is adjusted by the supervisor 720 until signal is properly recovered by the DSP that is part of the receive PHY 752. The final adjustment is a measure of the T34 skew.

In one embodiment, the $T_{34}$ skew time is determined by sending a pulse on lanes 3 and 4 of the transmit PHY 734. In this embodiment, the optical TX 732 generates a coherent optical signal with two optical signal components 744A-B from these pulses. The coherent optical signal is recovered in the receive PHY 736 in lanes 3 and 4 (738C-D). In addition, two secondary optical signal components 746A-B are also generated from the transmit optical drivers 748C-D. Thus, each of the receive PHY lanes 3 and 4 receive two different electrical signals. Because these electrical signals originate from two different transmit PHY lanes, there will be a skew $T_{34}$ between the two different electrical signals received on each lane 3 and 4 (738C-D). With an unknown skew, the received electrical signals may not be recoverable by the RX DSP that is part of the receive PHY 706. This is because the RX DSP cannot interpret the electrical signals that are not within the required skew tolerances. In one embodiment, the T34 module 750 adjusts the relative origination times of the electrical signals generated by lanes 3 and 4 of the transmit PHY 734 such that the RX DSP 736 detects a recoverable signal on each of the lanes 3 and 4 (738C-D) of the receive PHY 736. In this embodiment, the difference of the origination times is related to the transmit skew time, $T_{34}$ and the receive skew time, $R_{34}$. Since the receive skew time is known from the determination as illustrated in FIG. 6B, the transmit skew time, $T_{34}$ can be determined. In one embodiment, the system 730 includes a supervisor 750 that records the overall skew times and solves for the receive PHY skew times. In one embodiment, the supervisor 750 is a separate computer that includes an optical skew module 754 that controls the skew time measurement and records the skew times. In another embodiment, the supervisor 750 is part of the network element that is testing and recording the skew times.

As is illustrated in FIGS. 7A-B, the transmit skew times, $T_{12}$ and $T_{34}$, can be determined. In one embodiment, with these skew times, the relative skew between lanes 1 and 2, and the relative skew between lanes 3 and 4 of the transmit PHY can be determined and compensated for. However, the relative skew between lane pairs (1,2) and (3,4) is not known. In one embodiment, the relative skew between lanes (1,2) and (3,4) can be determined by sending signals down lanes 1-4. In FIG. 7C, the transmit PHY 764 is coupled to an optical TX 762 with a set of lanes 770A-D. Each of the transmit 764 and receive 766 PHYs are electrical PHYs and each of these lanes 770A-D and 768A-D carries an electrical signal. In one embodiment, the electrical signals are labeled HI, HQ, VI, and VQ, which reference a different set of polarization and quadrature combinations. The optical TX 762 modulates these electrical signals into a coherent optical signal that is transported over an optical loopback 768 to the optical RX 782. The optical RX 782 converts the optical signal into a set of electrical signals that is transmitted to the receive PHY 766. The $T_{12}$-$T_{34}$ skew is adjusted by the supervisor 780 until signal is properly recovered by the DSP that is part of the receive PHY 766. The final adjustment is a measure of the $T_{23}$ skew (or alternatively, the $T_{13}$, $T_{14}$, or $T_{24}$ skew times).

In one embodiment, the $T_{23}$ skew time is determined by sending a pulse on lanes 1-4 of the transmit PHY 764. In this embodiment, the optical TX 762 generates a coherent optical signal with four optical signal components 774A-D from these pulses. The coherent optical signal is recovered in the transmit PHY 766 in lanes 1-4 (768A-D). In addition, the coherent optical signal includes an additional twelve secondary optical signals 776A-D are also generated from the transmit optical drivers 778A-D. Thus, each of the receive PHY lanes 1-4 receive an electrical signal that was due to four different optical signals components. Because these electrical signals originate from four different transmit PHY lanes, there will be a skew $T_{23}$ between the four different electrical signals received on each lane 1-4 (768A-D). With an unknown skew, the received electrical signals are may not be recoverable by the RX DSP that is part of the receive PHY 766. This is because the RX DSP cannot interpret the electrical signals that are not within the required skew tolerances. In one embodiment, the RX DSP adjusts the relative origination times of the electrical signals generated by lanes 1-4 of the transmit PHY 764 such that the RX DSP detects a recoverable signal on each of the lanes 1-4 (768A-D) of the receive PHY 766. In this embodiment, the difference of the origination times is related to the transmit skew times, ($T_{12}$, $T_{34}$, and $T_{23}$) and the receive skew time, ($R_{12}$ and $R_{34}$) Since the transmit and receive skew times are known (except for $T_{23}$) from the determination as illustrated in FIGS. 6A-B and 7A-B, the transmit skew time, $T_{23}$ can be determined. In one embodiment, the system 760 includes a supervisor 780 that records the overall skew times and solves for the receive PHY skew times. In one embodiment, the supervisor 780 is a separate computer that includes an optical skew module 784 that controls the skew time measurement and records the skew times. In another embodiment, the supervisor 780 is part of the network element that is testing and recording the skew times.

Figure 8:
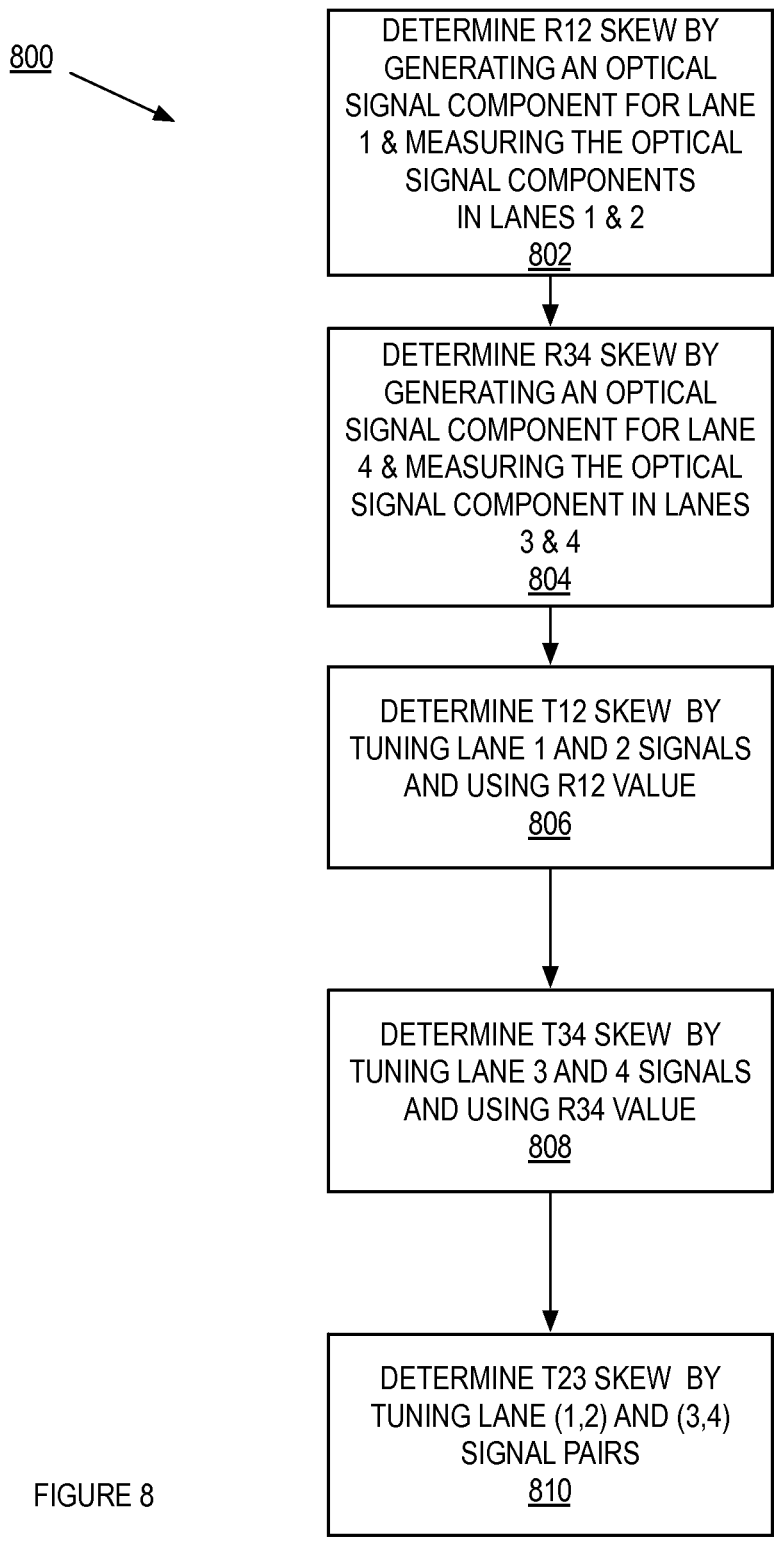
FIG. 8 is a flow diagram of one embodiment of a process to determine electrical skew times of an electrical signal with multiple lanes using an optical loopback.

FIG. 8 is a flow diagram of one embodiment of a process to determine electrical skew times of an electrical signal with multiple lanes using an optical loopback. In one embodiment, an optical skew module performs process 800, such as the optical skew module 1000 as described in FIG. 10 below. In FIG. 8, process 800 begins by determining a $R_{12}$ skew by generating a coherent optical signal with one optical signal component for transmit lane 1 and measuring the optical signal components in lanes 1 and 2 of a receive PHY at block 802. In one embodiment, process 800 determines the $R_{12}$ skew by generating a coherent optical signal with one optical signal component for transmit lane 1 and measuring the optical signal components for lanes 1 and 2 as described in FIG. 6A above. At block 804, process 800 determines a $R_{34}$ skew by generating a coherent optical signal with one optical signal component for transmit lane 3 and measuring the optical signal components in lanes 3 and 4 of a receive PHY. In one embodiment, process 800 determines the $R_{34}$ skew by generating a coherent optical signal with one optical signal component for transmit lane 3 and measuring the optical signal components in lanes 3 and 4 as described in FIG. 6B above.

With the $R_{12}$ and $R_{34}$ receive skew times know, process 800 can determine the transmit skew times. Process 800 determines the $T_{12}$ skew time by tuning the transmit lane 1 and 2 signals and using the $R_{12}$ skew time at block 806. In one embodiment, process 800 determines the $T_{12}$ skew time by tuning transmit lane 1 and 2 signals and using the $R_{12}$ skew time as described in FIG. 7A above. At block 808, process 800 determines the $T_{34}$ skew time by tuning the transmit lane 3 and 4 signals and using the $R_{34}$ skew time. In one embodiment, process 800 determines the $T_{34}$ skew time by tuning the transmit lane 3 and 4 signals and using the $R_{34}$ skew time as described in FIG. 7B above. Process 800 determines the $T_{23}$ skew by tuning the lane (1,2) and (3,4) signal pairs and using the $R_{12}$ and $R_{34}$ skew times at block 810. In one embodiment, process 800 determines the $T_{23}$ skew by tuning the lane (1,2) and (3,4) signal pairs and using the $R_{12}$ and $R_{34}$ skew times as described in FIG. 7C above.

Figure 9:
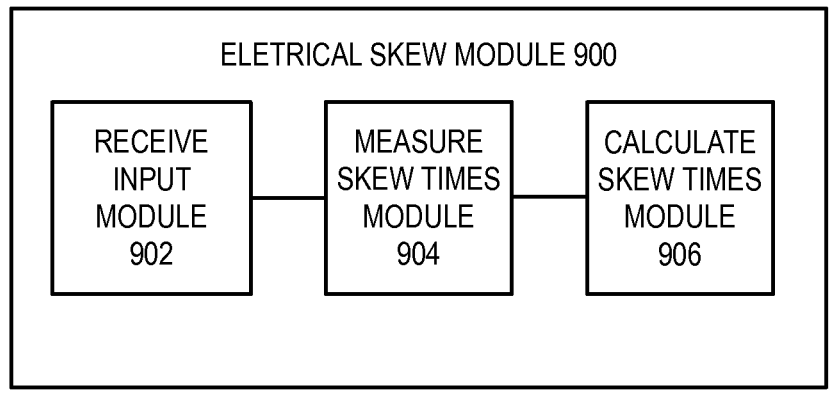
FIG. 9 is a block diagram of one embodiment of an electrical skew module that uses different electrical loopbacks to determine electrical skew times of an electrical signal with multiple lanes.

FIG. 9 is a block diagram of one embodiment of an electrical skew module 900 that uses different electrical loopbacks to determine skew times of an electrical signal with multiple lanes. In one embodiment, the electrical skew module is the electrical skew module as described in FIGS. 4A-D above. In one embodiment, the electrical skew module 900 includes a receive input module 902, measure skew times module 904, and calculate skew times module 906. In one embodiment, the receive input module 902 receives the configuration and constant input as described in FIG. 5, block 502 above. The measure skew times module 904 measure the skew using the different electrical loopback configurations as described in FIG. 5, blocks 506 and 510 above. The calculate skew times module 906 calculate the transmit and receive skew times using the measurements as described in FIG. 5, block 512 above.

Figure 10:
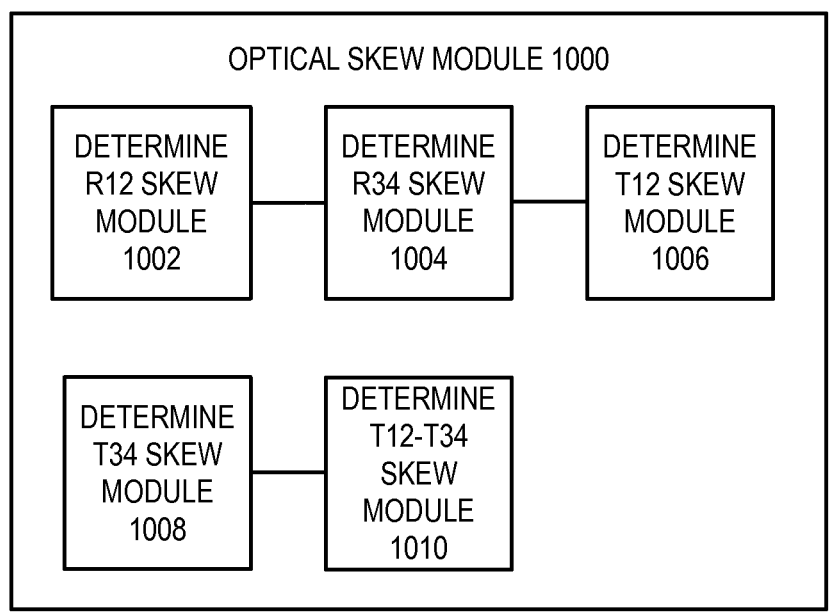
FIG. 10 is a block diagram of one embodiment of an optical skew module that determines electrical skew times of an electrical signal with multiple lanes using an optical loopback.

FIG. 10 is a block diagram of one embodiment of an optical skew module 1000 that determines electrical skew times of an electrical signal with multiple lanes using an optical loopback. In one embodiment, the optical skew module is the optical skew module as described in FIGS. 6A-B and 7A-C above. In one embodiment, the optical skew module 1000 includes determine $R_{12}$ skew module 1002, determine $R_{34}$ skew module 1004, determine $T_{12}$ skew module 1006, determine $T_{34}$ skew module 1008, and determine $T_{12}$-$T_{34}$ skew module 1010. In one embodiment, the determine $R_{12}$ skew module 1002 determines the $R_{12}$ skew time as described in FIG. 8, block 802 above. The determine $R_{34}$ skew module 1004 determines the $R_{34}$ skew time as described in FIG. 8, block 804 above. The determine $T_{12}$ skew module 1006 determines the $T_{12}$ skew time as described in FIG. 8, block 806 above. The determine $T_{34}$ skew module 1008 determines the $T_{34}$ skew time as described in FIG. 8, block 808 above. The determine $T_{12}$-$T_{34}$ skew module 1010 determines the $T_{12}$-$T_{34}$ skew time as described in FIG. 8, block 810 above.

Figure 11:
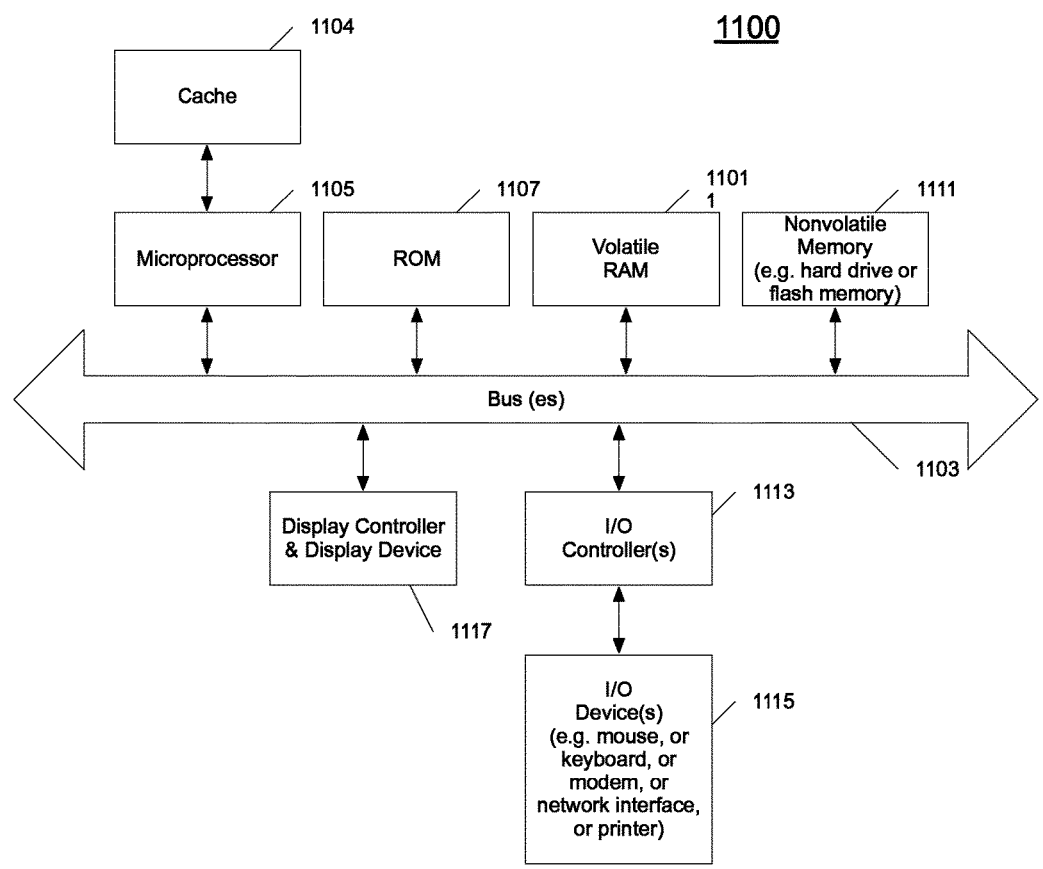
FIG. 11 illustrates one example of a typical computer system, which may be used in conjunction with the embodiments described herein.

FIG. 11 shows one example of a data processing system 1100, which may be used with one embodiment of the present invention. For example, the system 1100 may be implemented including a network element 100 as shown in FIG. 1. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1117 and to peripheral devices such as input/output (I/O) devices which may be mice, keyboards, modems, network interfaces, printers and other devices which are well known in the art. In one embodiment, the system 1100 includes a plurality of network interfaces of the same or different type (e.g., Ethernet copper interface, Ethernet fiber interfaces, wireless, and/or other types of network interfaces). In this embodiment, the system 1100 can include a forwarding engine to forward network date received on one interface out another interface.

Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
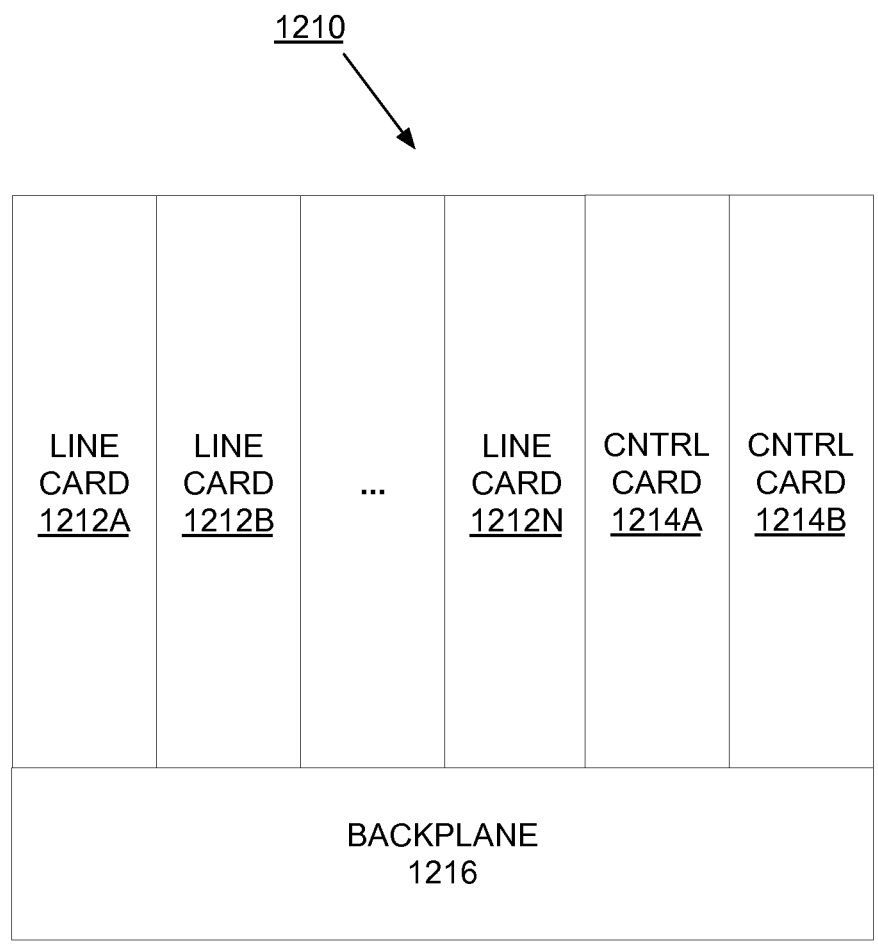
FIG. 12 is a block diagram of one embodiment of an exemplary network element that de-skews a coherent optical signal using an electrical or optical loopback.

FIG. 12 is a block diagram of one embodiment of an exemplary network element 1200 that determines transmit and receive skew times between pairs of a plurality of lanes of an electrical interface. In FIG. 12, the backplane 1206 couples to the line cards 1202A-N and controller cards 1204A-B. While in one embodiment, the line cards 1204A-B measure the different skew times between pairs of a plurality of lanes of an electrical interface. In one embodiment, the line cards 1202A-N process and forward traffic according to the network policies received from controller cards the 1204A-B. It should be understood that the architecture of the network element 1200 illustrated in FIG. 12 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "determining," "performing," "coupling," "measuring," "computing," "de-skewing," "tuning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method for determining transmit and receive skew times between pairs of a plurality of lanes of an electrical interface of a network element, the method comprising:

receiving a plurality of configurations corresponding to a plurality of electrical loopbacks that each couple to transmit and receive interfaces of the electrical interface via the plurality of lanes in different coupling patterns;

for each of the plurality of electrical loopbacks, coupling an electrical loopback to the transmit and receive interfaces of the electrical interface, and measuring overall skew times for the pairs of the plurality of lanes of the electrical interface; and computing the transmit and receive skew times for the transmit and receive interfaces from the overall skew times.

2. The non-transitory machine-readable medium of claim 1, wherein each of the plurality of lanes represents a different polarization and quadrature combination.

3. The non-transitory machine-readable medium of claim 1, further comprising:

de-skewing the electrical interface with the transmit and receive skew times.

4. The non-transitory machine-readable medium of claim 1, wherein the transmit and receive interfaces are physical interfaces.

5. The non-transitory machine-readable medium of claim 1, wherein one of the plurality of configurations is a straight-line electrical loopback.

6. The non-transitory machine-readable medium of claim 1, wherein one of the plurality of configurations is a twisted electrical loopback.

7. The non-transitory machine-readable medium of claim 1, wherein the plurality of lanes includes four lanes and the plurality of configurations is three different configurations.

8. The non-transitory machine-readable medium of claim 1, wherein each of the plurality of lanes carries a different electrical pulse that is used to transport a coherent optical signal.

9. The non-transitory machine-readable medium of claim 1, further comprising:

checking the transmit and receive skew times by using an electrical loopback that has a different configuration than the plurality of configurations used to compute the transmit and receive skew times.

10. A method for determining transmit and receive skew times between pairs of a plurality of lanes of an electrical interface of a network element, the method comprising:

receiving a plurality of configurations corresponding to a plurality of electrical loopbacks that each couple to transmit and receive interfaces of the electrical interface via the plurality of lanes in different coupling patterns;

for each of the plurality of electrical loopbacks, coupling an electrical loopback to the transmit and receive interfaces of the electrical interface, and measuring overall skew times for the pairs of the plurality of lanes of the electrical interface; and computing the transmit and receive skew times for the transmit and receive interfaces from the overall skew times.

11. The method of claim 10, wherein each of the plurality of lanes represents a different polarization and quadrature combination.

12. The method of claim 11, further comprising:

de-skewing the electrical interface with the transmit and receive skew times.

13. The method of claim 10, wherein the transmit and receive interfaces are physical interfaces.

14. The method of claim 10, wherein one of the plurality of configurations is a straight-line electrical loopback.

15. The method of claim 10, wherein one of the plurality of configurations is a twisted electrical loopback.

16. The method of claim 10, wherein the plurality of lanes includes four lanes and the plurality of configurations is three different configurations.

17. The method of claim 10, wherein each of the plurality of lanes carries a different electrical pulse that is used to transport a coherent optical signal.

18. The method of claim 10, further comprising:

checking the transmit and receive skew times by using an electrical loopback that has a different configuration than the plurality of configurations used to compute the transmit and receive skew times.

19. A device for determining transmit and receive skew times between pairs of a plurality of lanes of an electrical interface of a network element, the device comprising:

a memory for storing instructions; and a processing circuit that executes the instructions stored in the memory, which causes the processing circuit to receive a plurality of configurations corresponding to a plurality of electrical loopbacks that each couple to transmit and receive interfaces of the electrical interface via the plurality of lanes in different coupling patterns, for each of the plurality of electrical loopbacks, couple an electrical loopback to the transmit and receive interfaces of the electrical interface; and measure overall skew times for the pairs of the plurality of lanes of the electrical interface, and compute the transmit and receive skew times for the transmit and receive interfaces from the overall skew times.

20. The device of claim 19, wherein each of the plurality of lanes represents a different polarization and quadrature combination.

\* \* \* \* \*